Sept. 6, 1955  F. S. MALICK  2,717,066
ELECTROMAGNETIC CLUTCH OPERATOR
Filed June 10, 1950
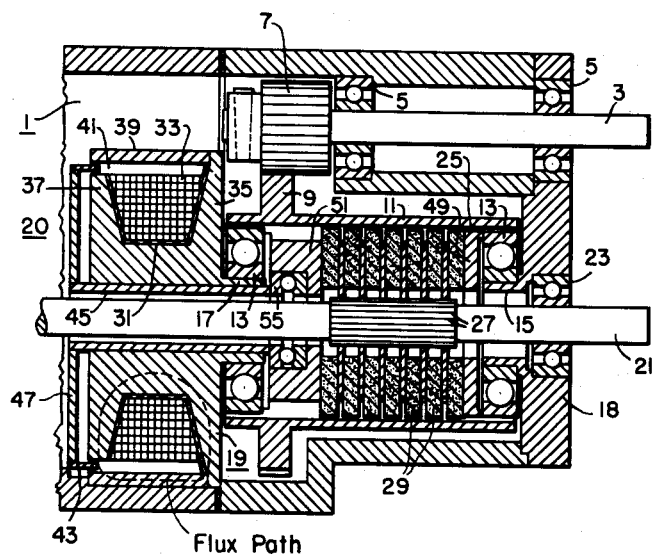
WITNESSES:
Edward Michaels
E. F. Oberheim
INVENTOR
Franklin S. Malick.
BY
Paul E. Friedemann
ATTORNEY

United States Patent Office 2,717,066
Patented Sept. 6, 1955

2,717,066
ELECTROMAGNETIC CLUTCH OPERATOR

Franklin S. Malick, Pittsburgh, Pa., assignor, by mesne assignments, to the United States of America as represented by the Secretary of the Navy Application June 10, 1950, Serial No. 167,393

2 Claims. (Cl. 192—84)

This invention relates generally to power transmitting drives, and more in particular to a friction clutch assembly embodying a plurality of friction discs for affording a mechanical coupling between the input and output shaft.

In the application of friction clutches to servomechanism systems, it is highly essential that these clutches be stable in operation. Frequently, in a servomechanism the friction clutch is operated by an electromagnet which is energized in dependence of certain control intelligences applied thereto. In the past it has been customary to employ a flat-faced magnet for actuating the friction discs of the clutch. This type of magnet, it will be appreciated, embodies an armature member which actuates the friction discs, and which in disengaged position is disposed in predetermined spaced relation with respect to the core structure of the electromagnet. When the electromagnet is energized, the armature is attracted towards the core structure with a force which varies inversely as the square of the length of the airgap. Thus the closer the armature is to the core structure or, the smaller the airgap, the higher the force becomes for a constant coil current, and it will be appreciated that as the stack of discs wear that the airgap will be diminished. Thus for the assumed constant coil current the output of the clutch will increase. This may create an unstable condition in the servo system requiring repeated recalibration.

Additionally an arrangement of this type is highly critical insofar as adjustment is concerned. This will be appreciated from a consideration of a practical embodiment in which, in order to achieve the necessary force for operating the friction discs, the airgap between the armature and the core structure was of the order of 2/100 of an inch with the discs disengaged. From this it will be appreciated that after a short period of use the wear of the friction discs will be sufficient for the armature to engage the core structure thereby arresting its movement before the friction discs have been moved into proper frictional engagement. Thus after a relatively short period of time of operation of the clutch in the servo system, clutch failure may occur, resulting in disablement of the system.

Accordingly, it is one object of this invention to provide an electromagnetically operated clutch assembly which has a long useful life.

Another object of this invention is to provide an electromagnetically operated clutch assembly in which the magnet force for a given coil current throughout the life of the clutch assembly is essentially constant.

More specifically stated, it is an object of this invention to provide an electromagnetically operated clutch assembly embodying a long stroke type of magnet.

The foregoing statements are merely illustrative of the various aims and objects of this invention. Other objects and advantages will become apparent upon a study of the following disclosure when considered in conjunction with the accompanying drawing, in which the single figure thereof is a longitudinal sectional view of a clutch assembly embodying the principles of this invention.

In the drawing the clutch assembly includes a housing generally designated 1. An input shaft 3 is journalled in bearings 5 disposed in the upper section of the housing 1. Input shaft 3 carries a drive pinion 7 at its extremity inside the housing. This drive pinion 7 meshes with a gear 9 which may be an integral part of, or attached to, a clutch barrel 11. Bearings 13, which journal the opposite ends of the clutch barrel 11, are mounted upon bearing seats 15 and 17 respectively. Bearing seat 15 is supported by an end plate 18 which closes one end of the clutch housing 1, while bearing seat 17 is supported at one end of the core structure 19 of an electromagnet assembly generally designated 20. As illustrated, these bearings are disposed in coaxial relation and an output shaft 21 is positioned concentrically of this assembly. The ouput shaft 21 is journalled in a bearing 23 mounted in the end plate 18 of the housing. The other end of this shaft 21 is similarly journalled at one end of a clutch assembly corresponding exactly to that herein illustrated. Only half of this clutch assembly is illustrated in the interest of simplicity, since both of these sections are the same.

Clutch barrel 11 is internally splined at 25 while the output shaft 21 is provided with an external spline designated 27. A stack of friction discs 29 is disposed within the clutch barrel about the splined section of the output shaft 21. The splines on the barrel and on the output shaft respectively engage alternate discs of the disc stack to thereby afford a driving connection between the clutch barrel 11 and the output shaft 21 when the discs are biased into engagement one with the other.

The biasing means for the discs includes the electromagnet 20 having the core structure 19 which is fastened within the housing 1. This core structure is of circular configuration, being concentrically disposed about the output shaft 21 and having a circumferential recess 31 therein in which a coil 33 is disposed. The magnetic core structure 19 is therefore essentially of the shape of a spool defining a cross section a U-shaped magnetic circuit about the coil 33. The right flange 35, as viewed, of this magnetic circuit, is of larger diameter than the left flange 37 and a ring 39, of magnetic material, which engages the right flange 35 completing the magnetic circuit on the outside of the coil 33, is therefore spaced from the peripheral edge of the left flange 37 by a predetermined amount, forming a radial airgap of circular plan form. An armature member 43 is fitted into this radial airgap in spaced relation with the confronting portions of the magnetic circuit which define this radial airgap, thereby forming two small radial airgaps, one on each side of the ring-shaped armature and which are in series in the magnetic circuit.

Armature member 43 is mounted for linear movement transversely of the radial airgap 41 by means of a thrust tube 45 of non-magnetic material which is slidably mounted in the opening centrally of the spool-shaped core structure 19. A disc 47 of non-magnetic material which is attached to the left-hand end of the brass thrust tube, as viewed, is attached at its outer peripheral edge to the ring-shaped armature 43. Thus it will be appreciated that sliding movement of the thrust tube 45 results in movement of the ring-shaped armature transversely of the air gap 41.

The disc stack 29 is mounted between the thrust plates 49 and 51, respectively, on the right and left-hand ends of the stack. Thrust plate 49 seats against the outer face of the bearing 13, while the thrust plate 51 is slidably mounted for movement axially of the disc stack on the surfaces of splines 25 at the left end of the clutch barrel 11 in a position between the disc stack and the associated bearing 13. Thrust plate 51 is counterbored to receive a thrust bearing 55 against which the right-hand end of the thrust tube 45 bears.

With the arrangement illustrated, it will be appreciated that upon energization of coil 33 the magnetic flux traversing airgap 41 and the smaller airgaps formed on each side of the armature member will attract the armature into the radial airgap 41. However, with this assembly, the force of attraction is essentially independent of the displacement of the armature with respect to the core along its path of movement, because with this arrangement there is no change in the dimensions of any of the airgaps which are involved. There is thus provided what may be termed a linear pull magnet, which if properly matched in its physical parameters with the requirements of the clutch components results in a clutch assembly having a long useful life, since the effect of wearing of the discs on the function of the clutch is effectively minimized. In one practical embodiment of this device it was found that the clutch discs could wear up to ⅛ of an inch without appreciably effecting the operation of the clutch as a whole.

The foregoing disclosure and the showing made in the drawing are merely illustrative of the principles of this invention and are not to be interpreted in a limiting sense.

I claim as my invention:

1. In an electromagnetic clutch operator adapted to cause the engagement of a pair of relatively movable clutch members subject to wear, the combination of an operating member for biasing said clutch members in one direction to cause engagement thereof, a member of circular configuration having a circumferential recess therein and made from a magnetic material, a coil in said recess adapted to be energized in varying degree, a ring of magnetic sheet material disposed about said circular member in a position engaging one peripheral edge thereof and straddling said recess to define a radial airgap with the other peripheral edge thereof, a ring-shaped armature of magnetic material fitted partially into said airgap and in spaced relation with the sides thereof to define a pair of radial airgaps, support means supporting said armature member for linear movement transversely of said airgap, and means connecting said armature member with said operating member.

2. In a friction clutch assembly, the combination of, an input shaft, a clutch barrel driven by said input shaft, an output shaft, means supporting said output shaft concentrically of said clutch barrel, a plurality of friction discs subject to wear, spline means internally of said barrel and on said output shaft, respectively, engaging alternate friction discs, a circular electromagnet including a coil adapted to be energized in varying degree, said electromagnet having a magnetic circuit including a radial airgap of circular plan form, means supporting said electromagnet concentrically of said output shaft, tubular support means slidably mounted within said electromagnet and concentrically of said output shaft at one side of said discs, a thrust member on said shaft between said tubular support means and said discs and movable by said support means to engage said friction discs, a ring-shaped armature partially fitted into said radial airgap in spaced relation with the sides thereof, and means connecting said armature to said support means.

References Cited in the file of this patent

UNITED STATES PATENTS

| | | |
|---|---|---|
| 1,459,358 | Buchenberg | June 19, 1923 |
| 1,960,004 | Franz | May 22, 1934 |
| 2,046,910 | Barrett | July 7, 1936 |
| 2,096,763 | Ray et al. | Oct. 26, 1937 |
| 2,187,835 | Martin | Jan. 23, 1940 |
| 2,226,309 | Gleasman | Dec. 24, 1940 |
| 2,354,854 | Doll | Aug. 1, 1944 |
| 2,512,065 | Rostu | June 20, 1950 |

FOREIGN PATENTS

| | | |
|---|---|---|
| 617,406 | Great Britain | Feb. 4, 1949 |
| 217,088 | Switzerland | Sept. 3, 1941 |